United States Patent [19]

Matthäus

[11] 4,387,266

[45] Jun. 7, 1983

[54] FOIL-INSULATED HIGH VOLTAGE BUSHING WITH EMBOSSED POTENTIAL CONTROL INSERTS

[75] Inventor: Günther Matthäus, Spardorf, Fed. Rep. of Germany

[73] Assignee: Siemens Aktiengesellschaft, Munich, Fed. Rep. of Germany

[21] Appl. No.: 221,253

[22] Filed: Dec. 30, 1980

[30] Foreign Application Priority Data

Jan. 18, 1980 [DE] Fed. Rep. of Germany ....... 3001810

[51] Int. Cl.³ ...................... H01B 17/28; H01G 1/015; H01G 4/22; H01G 4/32

[52] U.S. Cl. .................................. 174/31 R; 174/143; 361/303; 361/314

[58] Field of Search ................. 174/25 R, 25 G, 25 P, 174/31 R, 143; 361/303, 304, 314, 315, 323, 326

[56] References Cited

U.S. PATENT DOCUMENTS

| | | | |
|---|---|---|---|
| 3,462,545 | 8/1969 | Grimmer | 174/143 |
| 4,228,481 | 10/1980 | DiNicola et al. | 361/303 X |

FOREIGN PATENT DOCUMENTS

| | | | |
|---|---|---|---|
| 106535 | 1/1939 | Australia | 174/25 R |
| 871344 | 5/1971 | Canada | 361/314 |
| 871345 | 5/1971 | Canada | 361/314 |
| 2327629 | 12/1974 | Fed. Rep. of Germany | 174/15 S |
| 1361079 | 7/1974 | United Kingdom | 361/314 |

OTHER PUBLICATIONS

Brand, U., et al., "Gas Impregnated Plastic Foils for High Voltage Insulation", *CIGRE Paper* No. 15-02, 1972, 8 pages.

Boening, P., *Kleines Lehrbuch der Elektrischen Festigkeit,* Karlsruhe, 1955, pp. 140-142.

Dietz, H., et al., "A Condenser Bushing with $SF_6$-Impregnated Plastic Film Insulation", *Third International Symposium on High Voltage Engineering,* Milan, Italy, Aug. 28-31, 1979, Report No. 32.09.

*Primary Examiner*—Laramie E. Askin

*Attorney, Agent, or Firm*—Kenyon & Kenyon

[57] ABSTRACT

A high voltage insulating bushing is formed of wound insulating foils and is provided with conductive parts which are at different electrical potentials and with a wound insulating body arranged between the conductive parts. The wound insulating body contains potential control inserts which are formed of embossed electrically conductive foils, and which are impregnated with an insulating medium. The resulting embossed potential control inserts are mechanically more stable than known potential control inserts which are formed of smooth foils. In one embodiment, the embossed potential control inserts may be wound between adjacent layers of embossed insulating foils so as to facilitate the evacuation of air occluded in the winding and the complete permeation of the portion of the winding near the potential control inserts with the insulating medium.

4 Claims, 2 Drawing Figures

FIG 2

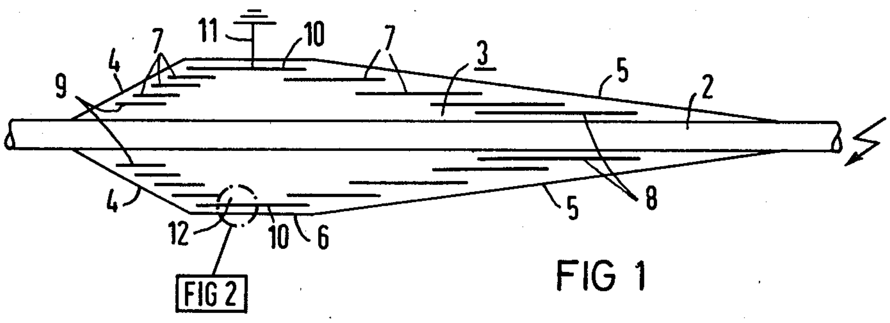
FIG 1
FIG 2
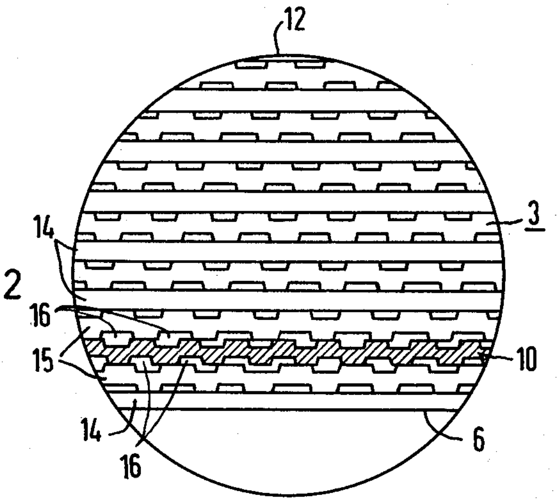

FOIL-INSULATED HIGH VOLTAGE BUSHING WITH EMBOSSED POTENTIAL CONTROL INSERTS

BACKGROUND OF THE INVENTION

This invention relates generally to bushings for insulating conductors bearing high voltages from ground potential, and more particularly, to an insulating body having embossed insulating foils and embossed, electrically conducting potential control inserts.

DISCUSSION OF THE PRIOR ART

It is often desirable in high voltage systems to pass high voltage conductors bearing potentials of 100 kilovolts and greater, through or near other conductive parts which are at ground potential. Typical high voltage devices which have a high possibility of producing arcing and flash-over include terminals of high voltage transformers and terminations of high voltage cables in switching gear. There is a need, therefore, for high voltage insulating devices which reliably suppress arcing.

The prior art has thrust at the problem of undesirable voltage breakdowns by providing bushing insulators of the type which surround high voltage conductors. One such insulator bushing is described in the publication "PROC. IEE", vol. 112, Jan. 1965, pages 89–102. This reference teaches a feed-through insulator for a cable-termination, the insulator being constructed of flexible, electrically insulating material, which is wound around the conductor. The bushing contains inserts of electrically conductive foil material which are wound concentrically with respect to one another, and insulated from each other. The conductive inserts function within the bushing to control the distribution of the electric field throughout the bushing insulator, and thereby improve the ability of the bushing to withstand surge voltages. For a discussion of the characteristics of dielectric materials, see: P. Boening; *Kleines Lehrbuch der Elektrischen Festigkeit* (Small Textbook on Dielectric Strength), Karlsruhe, 1955, pages 140–142.

It is known that the ability to withstand partial corona discharges and surge voltages is improved by filling the gaps and voids in the winding of the feed-through insulator body with an insulating medium, such as sulfur hexafluoride ($SF_6$). The strength of an electric field required to produce partial discharge in $SF_6$ is more than double the field strength at which partial discharges occur in air. Accordingly, any air which is present in the winding of the insulator must be removed by pumping, and replaced by $SF_6$. It is also known that the ability to withstand partial corona discharges and surge voltages is limited in high voltage bushing insulators, of the type described above, by the axial electric field strength at the outer edges of the electrically conductive potential control inserts. Thus, it must be insured that the outer edges of the electrically conductive potential control inserts be contained within the insulating medium $SF_6$.

It is a problem with the above-described bushing that the evacuation of air in the area near the metal foils of the potential control inserts, and the replacement of the air with $SF_6$, is difficult because the potential control inserts are enclosed by adjacent insulating foils over relatively large areas. This results in only partial permeation with $SF_6$ of the portion of the bushing insulator near the potential control inserts, thereby producing a reduction in the voltage of the conductor at which arcing occurs.

It is, therefore, an object of this invention to provide a high-voltage insulating bushing of such construction that the exchange of air for an insulating medium at the potential control inserts is facilitated.

SUMMARY OF THE INVENTION

The foregoing and other objects are achieved by this invention which provides a high voltage insulating bushing which is constructed using embossed, electrically conductive foils as potential control inserts.

The embossed potential control inserts contain embossed dimples which ensure that voids are created in the area near the potential control inserts during the winding of the insulator body. Such voids facilitate the evacuation of air and its replacement with an insulating medium, especially at the edges of the potential control inserts. As indicated, such permeation by an insulating medium of the volume within the insulating body near the potential control inserts, and particularly at its edges, substantially reduces the possiblity of arcing, thereby improving the ability of the insulator bushing to withstand surge voltages.

It is a further advantage of the inventive concept of using embossed conductive foils for potential control inserts that the embossed foils are generally mechanically more stable than smooth foils. In particular, the improved mechanical stability of embossed foils reduces the possibility that kinks will be produced in the potential control inserts during the winding operation. Such kinks would increase the strength of the electric field present along the surface of the insulator bushing, and thereby reduce its ability to withstand surge voltages. Moreover, embossed potential control inserts are more easily handled during the fabrication of the insulator bushing.

BRIEF DESCRIPTION OF THE DRAWINGS

Comprehension of the invention is facilitated by reading the following detailed description in conjunction with the annexed drawings, in which:

FIG. 1 is a schematic representation of a high voltage insulating bushing constructed in accordance with the principles of the invention; and FIG. 2 is a magnified view of a portion of the bushing of FIG. 1, showing greater detail.

DETAILED DESCRIPTION

FIG. 1 shows a longitudinal cross-section of a high voltage insulating bushing which may be used, for example, as part of a termination of a high voltage cable (see: PROC. IEE., supra). The insulating bushing is provided with a central conductor 2 which may be a copper tube bearing a high voltage, illustratively 200 kilovolts at 50 hertz. An insulator body 3 is concentrically arranged around the conductor, and has two conically-tapered surface portions 4 and 5 on respective sides of a cylindrical surface 6. The insulator bushing is wound from an insulating foil which may be a special paper or a plastic foil. A plurality of capacitor inserts 7, 8, 9, and 10 are represented in the figure by lines which are shown parallel to the central longitudinal axis (not specifically shown) of the conductor. The inserts are arranged with respect to one another so as to achieve a linear potential gradient along tapered surfaces 4 and 5 in a direction which extends outwardly from the central longitudinal axis of the conductor. Substantially linear potential distribution may be achieved along the surfaces 4 and 5 by the advantageous selection of the radial distances between the individual capacitor inserts with respect to the central longitudinal axis of the conductor (see, for example: U.S. Pat. No. 3,462,545). In such an arrangement, capacitor inserts 8 and 9, which are closest to conductor 2, are at high voltage potential, while the outermost capacitor insert 10, which is near cylindrical surface 6, is provided with a terminal 11 for permitting an electrical connection to ground.

In some embodiments of the invention, the dielectric strength of insulator body 3 may be increased by impregnation with an insulating medium. Such a medium may be an oil, or a gas, such as sulfur hexafluoride ($SF_6$) or nitrogen ($N_2$). It will be assumed that the specific illustrative embodiment of insulator bushing 3 under discussion is impregnated with $SF_6$.

High voltage bushing embodiments which are intended for use at low temperatures, such as terminations of superconducting cables, may be saturated with a cryogenic medium such as helium, (see: German Patent DE-OS No. 2,327,629).

It has been learned that the partial corona discharge and surge voltage characteristics of an insulator bushing are limited essentially by the axial electric field strength at the outer edges of the electrically conductive potential control inserts 7–10, which are disposed near conical surfaces 4 and 5. It is therefore essential that the electrically conductive potential control inserts, particularly at their outer edges, be disposed within the insulating medium, and not in the air which was occluded during the winding process. The inventive concept which insures permeation by the insulating medium is discussed below with respect to FIG. 2 which is a magnified view of a cross-sectional area 12 of winding 3 in FIG. 1. Elements of structure in FIG. 2 which are also shown in FIG. 1 are identified with the same reference symbols.

In accordance with the invention, FIG. 2 shows the insulating body 3 to contain thin potential control inserts which are embossed prior to being wound in the insulating body. The figure shows a single potential control insert 10 which can be formed of a thin foil of metal, illustratively aluminum. Alternatively, the foils may be formed of an electrically conductive layer in combination with an insulating plastic layer. Plastic materials such as polyvinylchloride, polyethylene, polypropylene, or polycarbonate may be laminated with a conductive material, such as aluminum, and are suitable for use as the double layer foils. The foils are embossed so as to be provided with between 300 and 700, and preferably about 500, dimples per square centimeter.

The embossing will produce potential control inserts which have an overall embossed thickness which is at least 50 percent greater than the thickness of the foil prior to embossing. For example, an aluminum foil 18 micrometers thick can be used which, when embossed, has an overall embossed thickness of about 40 micrometers. The increased mechanical strength of such an embossed foil facilitates handling of the potential control insert during the winding of the insulator bushing.

The insulating body is wound of smooth insulating foils 14 which may be formed of polypropylene or polyethylene. A layer 15 of embossed insulating foil is disposed between respective layers 14 of smooth insulating foils. Embossed insulating foil 15 is provided with embossed dimples so as to contain approximately 500 dimples per square centimeter. Embossed insulating foil layers 15 are advantageously provided on both sides of embossed potential control insert 10. This ensures sufficient gaps and voids on either side of potential control insert 10 to ensure complete permeation by the $SF_6$ insulating medium, after the evacuation of the occluded air.

In the specific illustrative embodiment of FIG. 2, the potential control inserts are embossed so as to have dimpled embossing structures. However, other embossing structures are possible, as long as the impregnation of the insulating body 3 at the potential control insert is facilitated thereby.

Although the inventive concept disclosed herein has been described in terms of a specific embodiment and application, other applications and embodiments will be obvious to persons skilled in the pertinent art without departing from the scope of the claimed invention. Thus, for example, although the specific illustrative embodiment has been disclosed as a high voltage insulating bushing arranged around an electric conductor at high voltage with respect to ground, the invention is equally well suited for use in arrangements wherein high voltage potential is applied to the outside of the bushing, and ground potential is applied to the central conductor. The drawings and descriptions of the specific illustrative embodiment of the invention in this disclosure are illustrative of applications of the invention and should not be construed to limit the scope thereof.

What is claimed is:

1. A high voltage insulator bushing comprising:

a first conductor part;

a second conductor part;

an insulator body containing electrically conductive potential control means disposed between said first conductor part and said second conductor part, the insulator body containing the electrically conductive potential control means being formed of electrically conductive foil means embossed with between 300 and 700 dimpled depressions per square centimeter, said electrically conductive foil means having a predetermined smooth thickness prior to embossing and an overall predetermined embossed thickness after embossing which is at least 50% greater than said predetermined smooth thickness, and electrically insulating foil means formed of an embossed plastic foil, said electrically insulating foil means being arranged to be adjacent to said electrically conductive foil means; and a gaseous insulating medium impregnating the insulator body containing the electrically conductive potential control means, said gaseous insulating medium being formed of $SF_6$.

2. The high voltage insulator bushing of claim 1 wherein said electrically conductive foil means is formed of an aluminum foil.

3. The high voltage insulator bushing of claim 1 wherein said electrically conductive foil means is formed of a double layer foil, said double layer foil having a layer of electrically conductive material, and a layer of insulating material.

4. The high voltage insulator bushing of claim 3 wherein said electrically conductive layer of said double layer foil is formed of aluminum.

* * * * *